United States Patent [19]

Chodnekar et al.

[11] 3,867,415

[45] Feb. 18, 1975

[54] PROPENYL AND PROPYNYL ESTERS OF CHLORO SUBSTITUTED 2-OCTENOIC AND 2-NONENOIC ACIDS

[75] Inventors: Madhukar Subraya Chodnekar, Basel; Albert Pfiffner, Pfaffhausen; Norbert Rigassi, Arlesheim; Ulrich Schwieter, Reinach; Milos Suchy, Pfaffhausen, all of Switzerland

[73] Assignee: Hoffmann-La Roche Inc., Nutley, N.J.

[22] Filed: Mar. 15, 1972

[21] Appl. No.: 235,030

[30] Foreign Application Priority Data
Mar. 24, 1971  Switzerland.......................... 4335/71

[52] U.S. Cl....... 260/408, 260/410.9 N, 260/614 R, 260/633, 260/654 A, 424/189, 424/200, 424/206, 424/207, 424/219, 424/273, 424/276, 424/282, 424/300, 424/302, 424/306, 424/312, 424/320, 424/322, 424/326, 424/340, 424/347, 424/352, 424/354, 424/211, 424/212, 424/215, 424/217, 424/218
[51] Int. Cl.......................... C07c 69/62, A01n 9/24
[58] Field of Search...................... 260/408; 424/312

[56] References Cited
UNITED STATES PATENTS
3,634,470  1/1972  Romanuk et al. ................... 260/408
3,671,558  6/1972  Siddall et al. ................ 260/410.9 R FOREIGN PATENTS OR APPLICATIONS
2,038,958  2/1971  Germany OTHER PUBLICATIONS
Krimer, Zhurnal Organicheskoi Khimii, Vol. 7, No. 7, pp. 1367–1373, July, 1973.

Primary Examiner—Donald G. Daus
Assistant Examiner—D. G. Rivers
Attorney, Agent, or Firm—Samuel L. Welt; Jon S. Saxe; Richard A. Gaither

[57] ABSTRACT

Propenyl and propynyl esters of chloro and dichloro substituted, 2-octenoic, 2-nonenoic, 2-dodecenoic and 2-tridecenoic acids and propenyl and propynyl ethers of chloro and dichloro substituted, 2-octenyl, 2-nonenyl, 2-dodecenyl and 2-tridecenyl alcohols, and insecticide compositions that include at least one of the propenyl or propynyl esters or ethers and that can also include a conventional insect-poison.

5 Claims, No Drawings

PROPENYL AND PROPYNYL ESTERS OF CHLORO SUBSTITUTED 2-OCTENOIC AND 2-NONENOIC ACIDS

BACKGROUND OF THE INVENTION

Many conventional insect-poisons, such as the carbamates, the pyrethrins and the chlorinated hydrocarbons, although highly lethal to numerous insects, cannot be used indescriminately. Despite their value for protecting foodstuffs, feeds, textiles and plants, these insect-poisons tend to remain indefinitely in the environment after being used. They are not naturally degraded, and by remaining undegraded in the environment, their lingering residues tend to find their way into foods intended for human or cattle consumption. Moreover, because apparently many of these insect-poisons are not quantitatively degraded by mammalian organisms, their use can lead to the indirect injury of humans or other mammals. Thus, the decision to use many conventional insect-poisons cannot be made without some significant reservations. There has been a need, therefore, for effective insect-poison compositions having a reduced tendency to linger in the environment, to contaminate food and resist degradation in mammals.

SUMMARY OF THE INVENTION

In accordance with this invention, it has been found that chloro compounds of the formula:

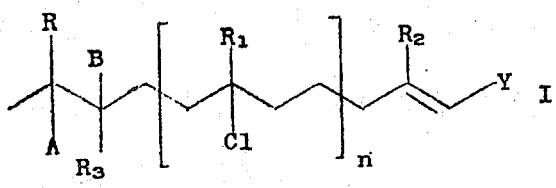

wherein R, $R_1$, and $R_2$ are lower alkyl; $R_3$ is hydrogen, methyl or ethyl; A is chlorine and B is hydrogen or when $R_3$ is methyl or ethyl A is chlorine and B is hydrogen or B is chlorine and A is hydrogen; Y is —COOR$_4$ or —CH$_2$OR$_4$; $R_4$ is propenyl or propynyl; and n is an integer of from zero to 1; are useful in killing and preventing the proliferation of insects by upsetting their hormonal balance.

In accordance with another embodiment of this invention, insecticide compositions are provided which include at least one of the chloro compounds and which can also include a conventional insect-poison.

The chloro esters of formula I are prepared by reacting an acid halide of the formula:

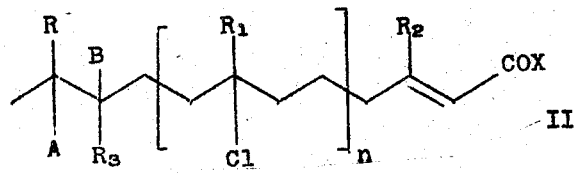

wherein R, $R_1$, $R_2$, $R_3$, A, B and n are as above; and X is chlorine, bromine or iodine; with an alcohol of the formula:

$R_4OH$

III wherein $R_4$ is as above.

The chloro esters are also prepared by treating an unsaturated ester of the formula:

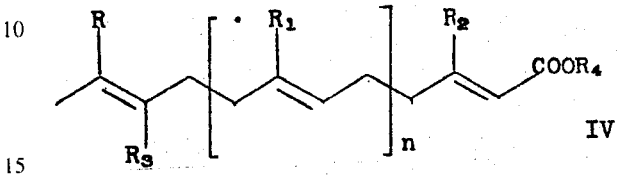

wherein R, $R_1$, $R_2$, $R_3$, $R_4$ and n are as above; in an inert organic solvent with hydrogen chloride.

The chloro ethers of formula I are prepared by reacting a compound of the formula:

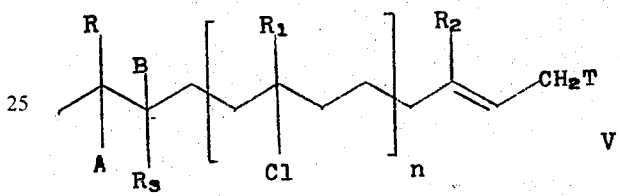

with a compound of the formula:

$R_4W$

VI wherein R, $R_1$, $R_2$, $R_3$, $R_4$, A, B and n are as above; and one of T and W is chlorine, bromine or iodine and the other is hydroxy.

DETAILED DESCRIPTION OF THE INVENTION

As used throughout this application, the term "insect-poison" comprehends a compound or a combination of compounds which kill, disable or repel insects by either chemical or physical effects upon the insects systems. In the insecticide compositions of this invention, any conventional insect-poison can be utilized. Among the preferred insect-poisons are the carbamates, pyrethrins, chlorinated-hydrocarbons, phosphoric acid esters, and thio-phosphoric acid esters.

Among the carbamates, especially preferred are the following:

1-naphthyl-methylcarbamate (Sevin);
m-(1-methylbutyl)-phenyl methylcarbamate;
m-(1-ethyl-propyl)-phenyl methylcarbamate;
3-methyl-5-isopropyl-phenyl methylcarbamate;
m-[(dimethylamino)-methylene]-amino)-phenyl methylcarbamate; and 1-dimethylcarbamoyl-5-methyl-3-pyrazolyl dimethylcarbamate. -amino-phenyl Among the pyrethrins, especially preferred are the following:
pyrethrum, particularly pyrethrin I and II, cinerin I and II, and jasmolin II;
2,2-dimethyl-3-(2-methylpropenyl)-cyclopropanecarboxylic acid 1-cyclohexene-1,2-dicarboximido-methyl ester;
2,2-dimethyl-3-(2-methylpropenyl)-cyclopropanecarboxylic acid 5-benzyl-3-furyl-methyl ester; and 2-allyl-4-hydroxy-3-methyl-2-cyclopenten-1-one esterified with a mixture of cis and trans 2,2-dimethyl-3-(2-methyl-propenyl)-cyclopropanecarboxylic acid (Allethrin).

Among the halogenated hydrocarbons, especially preferred are the following:
1,2,3,4,10,10-hexachloro-1,4,4a,5,8,8a-hexahydro-1,4-endo-exo-5,8-dimethano-naphthalene;
octachloro-camphor;
1,1,1-trichloro-2,2-bis-(p-chlorophenyl)ethane;
1,2,3,4,10,10-hexachloro-6,7-epoxy-1,4,4a,5,6,7,8,8a-octahydro-1,4-endo-endo-5,8-dimethano-naphthalene;
1,2,3,5,6,7,8,8-octachloro-2,3,3a,4,7,7a-hexahydro-4,7-methano-indene;
1,4,5,6,7,8,8-heptachloro-3a,4,7,7a-tetrahydro-4,7-endomethano-indene;
1,1,1-trichloro-2,2-bis-(p-methoxyphenyl)-ethane (Methoxychlor);
hexachloro-cyclohexane;
1,2,3,4,10,10-hexachloro-6,7-epoxy-1,4,4a,5,6,7,8,8a-octahydro-1,4-endo-exo-5,8-dimethano-napthalene;
1,1,1-trichloro-2,2-bis(p-chlorophenyl)-ethanol (Kelthane);
1,1-dichloro-2,2-bis-(p-ethylphenyl)-ethane;
1,1-dichloro-2,2-bis-(p-chlorophenyl)-ethane;
1,2-dibromo-3-chloro-propane;
1,2-dibromo-ethane; and
methyl bromide.

Among the phosphoric acid esters, especially preferred are the following:
2-carbomethoxy-1-prop-2-enyl dimethyl phosphate;
1,2-dibromo-2,2-dichloroethyl dimethyl phosphate;
1-chloro-diethylcarbamoyl-1-prop-2-enyl dimethyl phosphate;
tetraethyl pyrophosphate;
tetra-N-propyl dithiono-pyrophosphate;
0,0-dimethyl-O-2,2-dichlorovinyl-phosphate;
0,0-dimethyl-O-[1-methyl-2-(1-phenyl-carbethoxy)-vinyl]-phosphate and
0,0-dimethyl-(1-hydroxy-2,2,2-trichloroethyl)-phosphonate.

Among the thiophosphoric acid esters, especially preferred are the following:
S-[1,2-bis-(carbethoxy)-ethyl]-0,0-dimethyl-dithiophosphate (Malathion);
0,0-diethyl-O-(2-isopropyl-4-methyl-6-pyrimidyl)-thiophosphate;
0,0-dimethyl-O-(p-nitrophenyl)-thiophosphate;
0,0-diethyl-O-(p-nitrophenyl)-thiophosphate;
0,0-dimethyl-S-[4-oxo-1,2,3-benzotriazin-3-(4H)-yl-methyl]-dithiophosphate;
0,0-diethyl-S-(2-ethylthio)-ethyl-dithiophosphate;
0,0-dimethyl-S-(2-ethylthio)-ethyl-thiophosphate;
0,0-dimethyl-O-(2-ethylthio)-ethyl-thiophosphate;
0,0-diethyl-S-(2,5-dichlorophenyl-thiomethyl)-dithiophosphate;
2,3-p-dioxandithio S,S'-bis-(0,0-diethyl-dithiophosphate);
0,0,0',0'-tetraethyl-S,S'-methylene-bis-(dithiophosphate); and
s-{[(p-chlorophenyl)-thio]-methyl}-0,0-diethyl-dithiophosphate.

Among the other preferred insect-poisons, especially preferred are the following:

N,N-dimethyl-N'-(2-methyl-4-chlorophenyl)-formamidine;
2-(p-tert.butylphenoxy)-isopropyl 2-chloroethyl sulphite;
p-chlorophenyl 2,4,5-trichlorophenyl sulphone;
6,7,8,9,10,10-hexachloro-1,5,5a,6,9,9a-hexahydro-6,9-methano-2,4,3-benzodioxathiepine 3-oxide;
N-(1,1,2,2-tetrachloroethyl-sulphinyl)-cyclohex-4-ene-1,2-dicarboximide;
2-dodecanoic acid 2-thiocyanate-ethyl ester;
crotonic acid 2-(1-methyl-heptyl)-4,6-dinitro-phenyl ester;
N-trichloro-methylthio-cyclohex-4-ene-1,2-dicarboximide;
N-trichloro-methylthio-phthalimide;
3,4-methylenedioxy-6-propyl-benzyl butyl diethylene glycol ether; and
rotenone.

As also used throughout this application, the term "chloro ester" comprehends an ester of formula I which has juvenile hormone-like activity. In this application, the term "chloro ether" comprehends an ether of formula I which has juvenile hormone-like activity. Herein, the term "chloro compound" comprehends a chloro ester or a chloro ether. The juvenile hormone-like activity of the chloro compounds interferes with insects hormonal systems, causing their transformation to the imago, their laying of viable eggs and the development of their eggs to be disrupted. The disruptions, which are the characteristics of juvenile hormone activity, effectively prevent affected insects from maturing and proliferating.

Among the preferred chloro compounds are:
7-chloro-3,7-dimethyl-2-octenoic acid propynyl ester;
7-chloro-3,7-dimethyl-2-octenyl propynyl ether;
7-chloro-3,7-dimethyl-2-nonenoic acid propynyl ester;
6-chloro-3,6,7-trimethyl-2-octenoic acid propynyl ester,
7-chloro-3,6,7-trimethyl-2-octenoic acid propynyl ester, and mixtures thereof;
7-chloro-3-ethyl-7-methyl-2-nonenoic acid propynyl ester;
7-chloro-3,7-dimethyl-2-nonenoic acid propenyl ester;
7,11-dichloro-3,7,11-trimethyl-2-dodecenoic acid propenyl ester;
7,11-dichloro-3,7,11-trimethyl-2-tridecenoic acid propynyl ester;
7,10-dichloro-3,7,10,11-tetramethyl-2-dodecenoic acid propynyl ester,,
7,11-dichloro-3,7,10,11-tetramethyl-2-dodecenoic acid propynyl ester, and mixtures thereof;
7,11-dichloro-7-ethyl-3,11-dimethyl-2-tridecenoic acid propynyl ester;
7,11-dichloro-7-ethyl-3,11-dimethyl-2-tridecenyl propynyl ether;
7,11-dichloro-3,7,11-trimethyl-2-dodecenoic acid propynyl ester; and
7,11-dichloro-3,7,11-trimethyl-2-dodecenyl propynyl ether.

The particularly preferred chloro compounds include the chloro esters and the chloro compounds wherein $n$ is 1. Quite particularly preferred chloro compounds include the propynyl esters and especially the cis/trans and trans isomers.

As further used throughout this application, the term "lower alkyl" comprehends straight chain and branched chain saturated aliphatic groups having 1 to 6 carbon atoms, preferably methyl or ethyl.

The chloro compounds of formula I and mixtures thereof are useful in the control of invertebrate animals such as arthopods and nematodes, especially against various kinds of insects. For example, they are active against *Tenebrio molitor, Tineola biselliella, Carpocapsa pomonella, Leptinotarsa decemlineata, Calandra granaria, Dysdercus cingulatus* and *Ephestia kuehniella.*

The chloro compounds, particularly the chloro esters, are also resistant to the degradative effects of ultraviolet light. The juvenile hormone-like activity of the chloro compounds is not adversely affected by exposure to u.v. light. In fact, after irradiation with u.v. light over a period of 7 days, practically no loss of activity can be measured in tests with the chloro compounds against insects such as *Dysdercus cingulatus* and *Ephestia kuehniella.*

Futheremore, the chloro compounds are practically non-toxic to vertebrates. The toxicity of the compounds to vertebrate is greater than 1,000 mg/kg body weight. Moreover, these compounds are readily degraded, and the risk of accumulation is therefore excluded. Therefore, the chloro compounds can be used without fear of danger in the control of pests in animals, plants, foods and textiles.

Generally, in controlling invertebrate animals, a chloro compound is applied to the material to be protected, e.g., foodstuffs, feeds, textiles, plants, in concentrations of from about $10^{-3}$ to $10^{-6}$ gm/cm$^2$ of the material to be protected. Generally, it is preferred to utilize the chloro compound in a composition with a suitable inert carrier. Any conventional inert carrier can be utilized.

The chloro compounds can, for example, be used in the form of emulsions, suspensions, dusting agents, solutions or aerosols. In special cases, the materials to be protected (e.g., foodstuffs, seeds, textiles and the like) can also be directly impregnated with the appropriate chloro compound or with a solution thereof. Moreover, the chloro compounds can also be used in a form which only releases them by the action of external influences (e.g., contact with moisture) or in the animal body itself.

The chloro compounds can be used as solutions suitable for spraying on the material to be protected. Such solutions should contain a chloro compound in a concentration of 0.01–0.5 weight percent, preferably about 0.1 weight percent. These solutions can be prepared by dissolving or dispersing the chloro compound in a solvent, such as mineral oil fractions, cold tar oils, oils of vegetables or animal origins, hydrocarbons such as napthalenes, ketones such as methyl ethyl ketone or chlorinated hydrocarbons such as tetrachloroethylene, tetrachlorobenzene. The chloro compounds can be provided in forms suitable for dilution with water to form aqueous liquids such as, for example, emulsion concentrates, pastes or powders. The chloro compounds can be combined with solid carriers for making, dusting or strewing powders as, for example, talc, kaolin, bentonite, calcium carbonate, and calcium phosphate. The compositions containing the chloro compounds can contain, if desired, emulsifiers, dispersing agents, wetting agents, or other active substances such as fungicides, bactericides, nematocides and fertilizers.

The materials which are to be protected act as bait for the insect. In this manner, the insect, by contacting the material impregnated with a chloro compound also contacts the compound itself.

In addition, it has been surprisingly found that the activity of a conventional insect-poison can be increased by a factor of about 2 to 10 and more by combining the insect-poison with a chloro compound. The chloro compound and the insect-poison, when combined in an insecticide composition, provide up to the same degree of insecticidal activity with 10–50 percent of the previously used amounts of insect-poison, thereby reducing the residue of insect-poison in the environment to a tolerable degree. Such a composition possesses an additional advantage, i.e., after the abatement of the insecticidal action of the insect-poison, the juvenile hormone action comes to the fore so that the sequence of generations is interrupted and the pests are indirectly killed.

Thus, the rapidly commencing action of the insect-poison can be synergistically augmented by the juvenile hormone-like action of the chloro compound, which disturbs the subsequent re-building of the insect population, thereby permitting the intervals between sprayings of the insecticide composition to be extended.

The proportions of the two components of the combined insecticide composition, in accordance with this invention, can vary within wide limits according to the purpose of use, the mode of application, the pests to be controlled and other factors. Any ratio of insect-poison and chloro compound can be utilized as the active substance. However, it is preferred to use approximately 1 to 10 parts by weight of the chloro compound and approximately one to ten parts by weight of an insert-poison, with about equal parts by weight of the two components being especially preferred.

Pest-control agents containing the combined insecticide composition in accordance with this invention can be prepared in the form of granulates, concentrates or ready-to-use pest-control agents. The concentration of the insecticide composition depends upon the form of pest-control agent and the mode of use. The pest-control agents in accordance with this invention can contain solid or liquid inert carrier material to form solutions, sprays, aerosols or dusting powders, as set forth above with respect to the use of a chloro compound with an inert carrier material.

In general, the pest-control agents utilizing the combined insecticide compositions of the present invention can be prepared according to a process such as is described, for example, in *Farm Chemicals*, volume 128, pages 52 ff. The pest-control agents in accordance with this invention can additionally utilize yet other additives such as emulsifiers or masking agents.

The pest-control agents in accordance with this invention can exist in the form of concentrates which are suitable for storage and transport. Such concentrates can, for example, contain 40–80 weight percent of the synergistically active combination of insect-poison and chloro compound as the active substance and 60–20 weight percent of an inert carrier material. In preparing these concentrates, any conventional, liquid or solid inert carrier material can be utilized. Among the inert carrier materials which can be utilized are the liquid solvents and solid materials mentioned above.

These concentrates can be further diluted with similar or different carrier materials to concentrations which are suitable for practical use as ready-to-use pest-control agents. In the ready-to-use agents, the active substance concentration is preferably 0.1–20 weight percent of the synergistically active substance and 99.9–80 weight percent of an inert carrier material, with 0.1–10 weight percent of the active substance and 99.9–90 weight percent of the inert carrier being especially preferred. The active substance concentration can also be smaller or larger than the preferred concentration. In preparing these ready-to-use pest-control agents, any conventional liquid or solid inert carrier material may be utilized. Among the inert carrier materials which may be utilized are the liquid and solid materials mentioned above.

The reaction of the acid halide of formula II with the alcohol of formula III to form the chloro esters can be carried out in the presence of an acid binding agent. In this reaction, any conventional acid binding agent can be utilized. Among the preferred acid binding agents are the tertiary organic amines, such as pyridine, triethylamine and quinoline, particularly pyridine. The reaction can be carried out in an inert organic solvent. In this reaction, any conventional, inert organic solvent can be utilized. Among the preferred solvents are the hydrocarbons, such as benzene, toluene, hexane and isooctane, halogenated hydrocarbons, such as chloroform and carbon tetrachloride, ethers such as diethyl ether and dimethyl ether, and ethylene glycol. In carrying out this reaction, temperature and pressure are not critical, and the reaction can be carried out at room temperature and atmospheric pressure. Generally, it is preferred to carry out this reaction at a temperature of from about 0°C to room temperature.

The reaction of the unsaturated ester of formula IV with hydrogen chloride can be carried out in a conventional manner. The gaseous HCl can be bubbled with cooling into the solution containing the compound of IV. In this reaction, any conventional inert organic solvent can be utilized. Among the preferred solvents are included the ethers, such as diethyl ether, the hydrocarbons, such as hexane, and the chlorinated hydrocarbons, such as methylene chloride, chloroform and carbon tetrachloride. In this reaction, temperature and pressure are not critical, and the reaction can be carried out at room temperature and atemospheric pressure. Generally, it is preferred to carry out this reaction at a temperature of from about 0°C to room temperature. After treatment with HCl, the chlorinated reaction product can be worked-up in a conventional manner. Preferably, the reaction product is worked-up by evaporating the reaction mixture, taking-up the residue in diethyl ether, washing the ether solution with a saturated, aqueous bicarbonate solution, drying over sodium sulphate and evaporating to yield a pure product. Where necessary, the product can be further purified in a conventional manner, such as by chromatography on silica gel.

The reaction of the compound of formula V with the compound of formula VI to form the chloro ether can be carried out in the presence of an aprotic solvent. In carrying out this reaction, any conventional aprotic solvent can be utilized, hexamethyl phosphoric acid triamide being preferred. This reaction can be carried out in an inert organic solvent. In this reaction, any conventional inert organic solvent can be utilized. Among the preferred solvents are benzene, toluene, dioxane, 1,2-dimethoxyethane and tetrahydrofuran, preferably tetrahydrofuran. In carrying out this reaction, temperature and pressure are not critical, and the reaction can be carried out at room temperature and atmospheric pressure. Preferably, the reaction is carried out at a temperature of about 0°C. to the reflux temperature of the reaction mixture, 70°C. being a particularly preferred temperature for carrying out the reaction in tetrahydrofuran.

In carrying out the reaction of the compounds of formula V and VI, the hydroxy compound, which may be either compound, is initially converted by conventional technique, in an inert solvent, into an alkali metal or alkaline earth metal salt. One method of obtaining the salt is by reacting the hydroxy compound of formula V or VI with a suitable alkali metal or alkaline earth metal base. This conversion can be carried out in a conventional manner, utilizing a base such as an alkali metal or alkaline earth metal hydride, hydroxide, or alcoholate. Preferred bases are the sodium, potassium and calcium bases. In this reaction, any conventional inert organic solvent can be utilized, such as tetrahydrofuran. The resulting salt can then be directly reacted with the halide of formula V or VI to yield the compound of formula I.

The acid halide starting material of formula II can be obtained by first treating an acid of the formula:

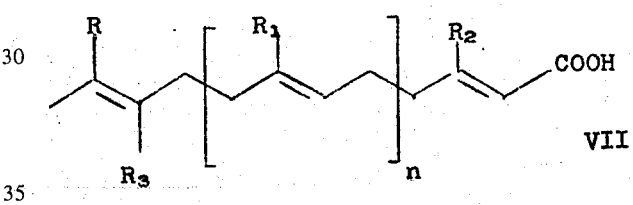

wherein R, $R_1$, $R_2$, $R_3$ and $n$ are as above; dissolved in acetic acid, with gaseous hydrogen chloride to form the chloro or dichloro substituted acid of the formula:

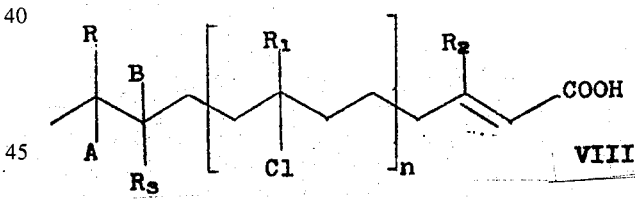

wherein R, $R_1$, $R_2$, $R_3$, A, B and $n$ are as above; and then treating the chlorinated acid of formula VIII with a halogenating agent.

The reaction in acetic acid of the acid of formula VII with hydrogen chloride can be carried out in a conventional manner. The gaseous HCl can be bubbled with cooling, into the acetic acid solution up to saturation. In this reaction, temperature and pressure are not critical, and the reaction can be conveniently carried out at 0° to 15°C. After evaporating off the acetic acid, the cis and trans isomers of the chlorinated acid of formula VIII can be isolated by conventional crystallization procedures. Preferably, crystallization is carried out in petroleum ether (b.p. 40°–60°C.) or in hexane, whereby the trans isomer of the chlorinated acid is crystallized out and the cis isomer can be isolated from the resulting mother liquor.

The halogenation of the chlorinated acid of formula VIII can be carried out by treatment with a halogenating agent such as thionyl chloride, phosphorus trichloride, thionyl bromide or phosphorous oxychloride, preferably thionyl chloride. This reaction can be carried out in an inert solvent. In this reaction, any conventional inert organic solvent can be utilized such as petroleum ether, benzene, or hexane. This reaction can also be carried out in the presence of an acid binding agent. In this reaction, any conventional acid binding agent can be utilized, with the tertiary organic amines being preferred. In this reaction, temperature and pressure are not critical, and the reaction can be carried out at room temperature and atmospheric pressure.

The starting material of formula IV can be obtained by esterifying an acid of formula VII. This esterification can be carried out in a conventional manner, such as by utilizing the solvent media and conditions of temperature and pressure set forth above for reacting the acid halide of formula II with the alcohol of formula III.

The alcohol starting materials of formula V, wherein T is hydroxy, can be prepared by treating a chlorinated acid of formula VIII with a reducing agent. Among the reducing agents that can be utilized are the lower alkoxy-(lower alkyleneoxy)-alkali-aluminum hydrides, preferably bis-(methoxyethyleneoxy)-sodium aluminum hydride and the alkali metal aluminum hydrides, preferably lithium aluminum hydride. In carrying out this reaction, the chlorinated acid of formula VIII is dissolved, depending upon its solubility properties, in a solvent such as, for example, tetrahydrofuran, dioxane, diethyl ether, hexane, toluene or xylene. When a lower alkoxy-(lower alkyleneoxy)-alkali metal)-aluminum hydride is utilized, the preferred solvent for the chlorinated acid is benzene, and when an alkali metal aluminum hydride is utilized, the preferred solvent is diethyl ether or tetrahydrofuran. In this reaction, the hydride reducing agent is preferably added in a benzene solution. It is normally sufficient to add the acid chloride and the hydride reducing agent in equimolar amounts. It may, however, on occasion be advantageous to employ a 10-20 percent excess of hydride reducing agent. In this reaction, temperature and pressure are not critical, and the reaction can be suitably carried out at a temperature of between $-70°C$ and $+80°C$. and at atmospheric pressure. In general, a temperature between $0°$ and $20°C$. is preferred.

The alcohol of formula V, obtained according to the foregoing reduction, can be converted, if desired, into a halide of formula V, wherein T is chlorine, bromine or iodine. The alcohol of formula V can be converted to the halide of formula V by treating the alcohol with a halogenating agent such as thionyl chloride, phosphorus trichloride, thionyl bromide, or phosphorus oxychloride, preferably thionyl chloride. This reaction can be carried out in an inert solvent. In this reaction, any conventional inert organic solvent can be utilized, such as petroleum ether, benzene, hexane or tetrahydrofuran, preferably tetrahydrofuran. This reaction can also be carried out in the presence of an acid binding agent. In this reaction, any conventional acid binding agent can be utilized, with the tertiary organic amines being preferred. In this reaction, temperature and pressure are not critical, and the reaction can be carried out at room temperature and atmospheric pressure.

The chloro compounds of formula I are obtained as mixtures of cis and trans isomers. The mixtures can be resolved into the isomeric forms in a conventional manner, for example, by adsorption on a material with selective activity. The isomer mixtures can also be resolved by dissolving them in an inert organic solvent, such as hexane, diethyl ether or ethyl acetate and adsorbing them on silica gel. The isomers adsorbed in various zones can be eluted with one of the aforementioned solvents or mixtures thereof and thereby isolated. In individual cases, an isomer mixture can also be resolved by preparative thin layer chromatography.

The examples which follow illustrate the invention. All temperatures are in degrees Centigrade. "Room temperature" is about 22°C. Nujol is mineral oil, and the percent of hydride in the mineral acid suspension is given as percent by weight. Unless otherwise stated, each compound is a cis/trans isomer mixture.

EXAMPLE 1

10.2 g of trans-7-chloro-3,7-dimethyl-2-octenoic acid are treated at room temperature with 23.8 g of thionyl chloride and heated with stirring for 15 minutes to 60°C. to form trans-7-chloro-3,7-dimethyl-2-octenoic acid chloride. The excess thionyl chloride is then evaporated off on a rotary evaporator, and 11.4 g of propargyl alcohol are added dropwise. The mixture is again heated for 15 minutes to 60°C., allowed to cool, poured onto ice-water and exhaustively extracted with diethyl ether. The combined ether solutions are washed with saturated, aqueous sodium bicarbonate solution and saturated, aqueous sodium chloride solution, dried over sodium sulphate and evaporated. Practically pure trans-7-chloro-3,7-dimethyl-2-octenoic acid propynyl ester is obtained as a highly viscous light-yellow oil. After chromatography on silica gel with hexane/diethyl ether (4:1 parts by volume), a sample boils in a bulb-tube at ca 105°C/0.001 mmHg; $n_D^{20} = 1.4897$.

EXAMPLE 2

Utilizing the procedure of Example 1, trans-7-chloro-3,7-dimethyl-2-nonenoic acid is converted to trans-7-chloro-3,7-dimethyl-2-nonenoic acid propynyl ester; boiling point ca 110°–115°C/0.001 mmHg; $n_D^{20} = 1.4872$.

EXAMPLE 3

Utilizing the procedure of Example 1, a mixture of cis/trans-6- and 7-chloro-3,6,7-trimethyl-2-octenoic acid is converted to a mixture of cis/trans- 6- and 7-chloro-3,6,7-trimethyl-2-octenoic acid propynyl ester.

EXAMPLE 4

Utilizing the procedure of Example 1, cis/trans-7-chloro-3-ethyl-7-methyl-2-noneoic acid is converted to cis/trans-7-chloro-3-ethyl-7-methyl-2-nonenoic acid propynyl ester; b.p. ca 110°C/0.001 mmHg in a bulb-tube; $n_D^{20} = 1.4910$.

EXAMPLE 5

10.9 g of trans-7-chloro-3,7-dimethyl-2-nonenoic acid are treated at room temperature with 23.8 g of thionyl chloride and heatd with stirring for 15 minutes to 60°C. The excess thionyl chloride is evaporated off on a rotary evaporator, and 11.6 g of allyl alcohol are added dropwise. The mixture is again heated for 15 minutes to 60°C., allowed to cool, poured onto ice-water and exhaustively extracted with diethyl ether. The combined ether phases are washed with saturated, aqueous sodium bicarbonate solution and saturated, aqueous sodium chloride solution, dried over sodium sulphate and evaporated. There is obtained practically pure trans-7-chloro-3,7-dimethyl-2-nonenoic acid allyl ester which, after chromatographing on silica gel with hexane diethyl ether (85.15 parts by volume), boils in a bulb-tube at ca 100°C/0.001 mmHg; $n_D^{20} = 1.4869$.

EXAMPLE 6

Utilizing the procedure of Example 5, 7-chloro-3,7-dimethyl-2octenoic acid is converted to 7-chloro-3,7-dimethyl-2-octenoic acid allyl ester.

EXAMPLE 7

Utilizing the procedure of Example 5, a mixture of 6- and 7-chloro-3,6,7-trimethyl-2-octenoic acid is converted to a mixture of 6- and 7-chloro-3,6,7-trimethyl-2-octenoic acid allyl ester.

EXAMPLE 8

Utilizing the procedure of Example 5, 7-chloro-3-ethyl -7-methyl-2-nonenoic acid is converted to 7-chloro-3-ethyl-7-methyl-2-nonenoic acid allyl ester.

EXAMPLE 9

Gaseous hydrogen chloride is bubbled at 0°–15°C. into a solution of 21 g of cis/trans-3,7-dimethyl-2,6-octadienoic acid in 400 ml of acetic acid up to saturation. The acetic acid and the hydrogen chloride are subsequently evaporated off under reduced pressure.

The highly viscous, syrup-like crude product consists of cis/trans-7-chloro-3,7-dimethyl-2Octenoic acid and can be directly used in the crude state. By crystallization of the crude product from petroleum ether (b.p. = 40°–60°C.) in the cold, there is obtained from hexane/-diethyl ether (7:3 parts by volume) pure trans-7-chloro-3,7-dimethyl-2-octenoic acid; melting point = 104°–105.5°C.

By repeatedly crystallizing out the trans-7-chloro-3,7,-dimethyl-2-octenoic acid from the crude product, cis-7-chloro-3,7-dimethyl-2-octenoic acid is also obtained as a viscous residue which can be directly used.

EXAMPLE 10

Utilizing the procedure of Example 9, 3,7-dimethyl-2,6-nonadienoic acid is converted to 7-chloro-3,7-dimethyl-2-nonenoic acid, and the trans-acid is crystallized therefrom, having an m.p. = 45.8°–46.8°C.

EXAMPLE 11

Utilizing the procedure of Example 9, 3,6,7-trimethyl-2,6-octadienoic acid is converted to a mixture of 6- and 7-chloro-3,6,7-trimethyl-2-octenoic acids.

EXAMPLE 12

Utilizing the procedure of Example 9, 3-ethyl-7-methyl-2,6-nonadienoic acid is converted to 7-chloro-3-ethyl-7-methyl-2-nonenoic acid, and the trans-isomer is crystallized therefrom having an m.p. 51°–52°C.

EXAMPLE 13

2.6 ml of thionyl chloride are added dropwise with stirring and ice-cooling to a solution of 9.3 g of trans-7,11-dichloro-3,7,11-trimethyl-2-dodecenoic acid and 2.92 ml of pyridine in 50 ml of absolute diethyl ether, and the mixture is stirred for 1 hour at room temperature. The precipitated pyridine hydrochloride is subsequently filtered off, washed with diethyl ether and the combined filtrate and washings evaporated. After the addition of 6.7 g of propargyl alcohol, the mixture is heated for 30 minutes to 60°C., allowed to cool, poured onto ice-water, exhaustively extracted with diethyl ether, the combined ether extracts washed with dilute ice-cold hydrochloric acid, saturated, aqueous sodium bicarbonate solution and saturated, aqueous sodium chloride solution, dried over sodium sulphate and evaporated. The resulting, practically pure trans-7,11-dichloro-3,7,11-trimethyl-2-dodecenoic acid propynyl ester is purified by chromatography on silica gel with hexane/diethyl ether (4:1 parts by volume). A sample boils in a bulb-tube at ca 125°C/0.001 mmHg; $n_D^{20} = 1.4982$.

EXAMPLE 14

7 g of trans-7,11-dichloro-3,7,11-trimethyl-2-tridecenoic acid are treated at room temperature with 9.23 g of thionyl chloride and heated with stirring for 15 minutes to 50°–60°C. The excess thionyl chloride is evaporated off on a rotary evaporator, and 4.3 g of propargyl alcohol are added. The mixture is again heated for 15 minutes to 60°C., allowed to cool, poured onto ice-water and exhaustively extracted with diethyl ether. The combined ether extracts are washed with saturated, aqueous sodium bicarbonate solution and saturated, aqueous sodium chloride solution, dried over sodium sulphate and evaporated. The resulting practically pure trans-7,11-dichloro-3,7,11-trimethyl-2-tridecenoic acid propynyl ester is purified by chromatography on silica gel with hexane/diethyl ether (9:1 parts by volume). A sample boils in a bulb-tube at ca 140°C/0.001 mmHg; $n_D^{20} = 1.4969$.

EXAMPLE 15

Utilizing the procedure of Example 14, a mixture of 7,10- and 7,11-dichloro-3,7,10,11-tetramethyl-2-dodecenoic acid is converted to a mixture of 7,10- and 7,11-dichloro-3,7,10,11-tetramethyl-2-dodecenoic acid propynyl ester.

EXAMPLE 16

Utilizing the procedure of Example 14, 7,11-dichloro-7-ethyl-3,11-dimethyl-2-tridecenoic acid is converted to 7,11-dichloro-7-ethyl-3,11-dimethyl-2-tridecenoic acid propynyl ester; $n_D^{20} = 1.4973$.

EXAMPLE 17

43.2 g of trans-7,11-dichloro-3,7,11-trimethyl-2-dodecenoic acid are treated at room temperature with 66.6 g of thionyl chloride and heated with stirring for 15 minutes to 60°C. The excess thionyl chloride is evaporated off on a rotary evaporator, and 32.6 g of allyl alcohol are added dropwise. The mixture is again heated for 15 minutes to 60°C., allowed to cool, poured onto ice-water and exhaustively extracted with diethyl ether. The combined ether solutions are washed with saturated, aqueous sodium bicarbonate solution and saturated, aqueous sodium chloride solution, dried over sodium sulphate and evaporated. The resulting practically pure trans 7,11-dichloro-3,7,11-trimethyl-2-dodecenoic acid allyl ester is purified by chromatography on silica gel with hexane/diethyl ether (9:1 parts by volume). A sample boils in a bulb-tube at ca 130°C/0.001 mmHg; $n_D^{20} = 1.4891$.

EXAMPLE 18

Utilizing the procedure of Example 17, 7,11- dichloro-3,7,11-trimethyl-2-tridecenoic acid is converted to 7,11-dichloro-3,7,11-trimethyl-2-tridecenoic acid allyl ester.

EXAMPLE 19

Utilizing the procedure of Example 17 a mixture of 7,10- and 7,11-dichloro-3,7,10,11-tetramethyl-2-dodecenoic acid is converted to a mixture of 7,10- and 7,11-dichloro-3,7,10,11-tetramethyl-2-dodecenoic acid allyl ester.

EXAMPLE 20

Utilizing the procedure of Example 17, 7,11-dichloro-7-ethyl-3,11-dimethyl-2-tridecenoic acid is converted to 7,11-dichloro-7-ethyl-3,11-dimethyl-2-tridecenoic acid allyl ester.

EXAMPLE 21

Gaseous hydrogen chloride is bubbled at 0°C.–15°C. into a solution of 90 g of cis/trans 3,7,11-trimethyl-2,6,10-dodecatrienoic acid in 1700 ml of acetic acid up to saturation. The acetic acid and the hydrogen chloride are subsequently evaporated off under reduced pressure.

The highly viscous crude product consists of cis/trans-7,11-dichloro-3,7,11-trimethyl-2-dodecenoic acid and can be directly used in the crude state.

By crystallization of the crude product from petroleum ether (b.p. = 40°–60°C.) in the cold, there is obtained pure trans-7,11-dichloro-3,7,11-trimethyl-2-dodecenoic acid; m.p. = 92.5°–94°C.

By repeatedly crystallizing out the trans-dichloroacid from the crude product, cis-7,11-dichloro-3,7,11-trimethyl-2-dodecenoic acid is obtained as a viscous residue which can be directly used.

EXAMPLE 22

Utilizing the procedure of Example 21, 3,7,11-trimethyl-2,6,10-tridecatrienoic acid is converted to 7,11-dichloro-3,7,11-trimethyl-2-tridecenoic acid, and the trans-isomer is crystallized therefrom, having an m.p. = 65.5°–67°C.

EXAMPLE 23

Utilizing the procedure of Example 21, 3,7,10,11-tetramethyl-2,6,10-dodecatrienoic acid is converted to a mixture of 7,10-and 7,11-dichloro-3,7,10,11-tetramethyl-2-dodecenoic acids,

EXAMPLE 24

Utilizing the procedure of Example 21, 7-ethyl-3,11-trimethyl-2,6,10-tridecatrienoic acid is converted to 7,11-dichloro-7-ethyl-3,11-dimethyl-2-tridecenoic acid.

EXAMPLE 25

650 mg of sodium hydride (50 percent Nujol suspension) are washed twice with hexane, covered with 7 ml of absolute tetrahydrofuran, and, with ice-cooling, 4.5 g of trans-7,11-dichloro-3,7,11-trimethyl-2-dodecen-1-ol in 20 ml of absolute tetrahydrofuran are added dropwise. The mixture is then stirred for 1.5 hours at room temperature. There are subsequently added dropwise 1.7 g of propargyl bromide in 5 ml of absolute tetrahydrofuran and thereafter, with occasional ice-cooling, 6 ml of hexamethyl phosphoric acid triamide. The mixture is stirred for 3.5 hours at room temperature, poured onto water, and exhaustively extracted with diethyl ether. The combined ether solution are washed with saturated, aqueous sodium chloride solution, dried over sodium sulphate and evaporated. By chromatography on silica gel with hexane/diethyl ether (4:1 parts by volume), there is obtained pure trans 7,11-dichloro-3,7,11-trimethyl-2-dodecenyl propynyl ether. A sample is distilled in a bulbtube with slight decomposition; $n_D^{20}$ = 1.4845.

EXAMPLE 26

Utilizing the procedure of Example 25, 7-chloro-3,7-dimethyl-2-octen-1-ol is converted to 7-chloro-3,7-dimethyl-2-octenyl propynyl ether.

EXAMPLE 27

Utilizing the procedure of Example 25, 7-chloro-3,7-dimethyl-2-nonen-1-ol is converted to 7-chloro-3,7-dimethyl-2-noneyl propynyl ether.

EXAMPLE 28

Utilizing the procedure of Example 25, a mixture of 6- and 7-chloro-3,6,7-trimethyl-2-octen-1-ol is converted to a mixture of 6- and 7-chloro-3,6,7-trimethyl-2-octenyl propynyl ether.

EXAMPLE 29

Utilizing the procedure of Example 25, 7-chloro-3-ethyl-7-methyl-2-nonen-1-ol is converted to 7-chloro-3-ethyl-7-methyl-2-nonenyl propynyl ether.

EXAMPLE 30

Utilizing the procedure of Example 25, 7,11-dichloro-3,7,11-trimethyl-2-tridecen-1-ol is converted to 7,11-dichloro-3,7,11-trimethyl-2-tridecenyl propynyl ether.

EXAMPLE 31

Utilizing the procedure of Example 25, a mixture of 7,10- and 7,11-dichloro-3,7,10,11-tetramethyl-2-dodecen-1-ol is converted to a mixture of 7,10- and 7,11-dichloro-3,7,10,11-tetramethyl-2-dodecenyl propynyl ether.

EXAMPLE 32

Utilizing the procedure of Example 25, 7,11-dichloro-7-ethyl-3,11-dimethyl-2-tridecen-1-ol is converted to 7,11-dichloro-7-ethyl-3,11-dimethyl-2-tridecenyl propynyl ether; $n_D^{20}$ = 1.4902.

EXAMPLE 33

14 g of a 70 percent by weight benzene solution of sodium dihydro-bis-(2-methoxy-ethoxy)-aluminate are added dropwise with ice-cooling to 10 g of trans-7,11-dichloro-3,7,11-trimethyl-2-dodecenoic acid in 100 ml of absolute benzene. The mixture is stirred for 45 minutes at room temperature and subsequently poured onto water. The benzene layer is separated off, the aqueous phase is re-extracted with benzene, and the combined benzene phases are washed with saturated, aqueous sodium chloride solution, dried over sodium sulphate and evaporated. By chromatography on silica gel with hexane/diethyl ether (3:2 parts by volume), there is obtained pure trans-7,11-dichloro-3,7,11-trimethyl-2-dodecen-1-ol; $n_D^{20}$ = 1.4893. Decomposition occurs at the boiling point.

EXAMPLE 34

Utilizing the procedure of Example 39, 7-chloro-3,7-dimethyl-2-octenoic acid is converted to 7-chloro-3,7-dimethyl-2-octen-1-ol.

EXAMPLE 35

Utilizing the procedure of Example 33, 7-chloro-3,7-dimethyl-2-nonenoic acid is converted to 7-chloro-3,7-dimethyl-2-nonen-1-ol.

EXAMPLE 36

Utilizing the procedure of Example 33, a mixture of 6- and 7-chloro-3,6,7-trimethyl-2-octenoic acid is converted to a mixture of 6- and 7-chloro-3,6,7-trimethyl-2-octen-1-ol.

EXAMPLE 37

Utilizing the procedure of Example 33, 7-chloro-3-ethyl-7-methyl-2-nonenoic acid is converted to 7-chloro-3-ethyl-7-methyl-2-nonen-1-ol.

EXAMPLE 38

Utilizing the procedure of Example 33, 7,11-dichloro-3,6,11-trimethyl-2-tridecenoic acid is converted to 7,11-dichloro-3,7,11-trimethyl-2-tridecen-1-ol.

EXAMPLE 39

Utilizing the procedure of Example 33, a mixture of 7,10- and 7,11-dichloro-3,7,10,11-tetramethyl-2-dodecenoic acid is converted to a mixture of 7,10- and 7,11-dichloro-3,7,10,11-tetramethyl-2-dodecen-1-ol.

EXAMPLE 40

Utilizing the procedure of Example 33, 7,11-dichloro-7-ethyl-3,11-dimethyl-2-tridecenoic acid is converted to 7,11-dichloro-7-ethyl-3,11-dimethyl-2-tridecen-1-ol.

EXAMPLE 41

21.6 g of cis/trans-7,11-dichloro-3,7,11-trimethyl-2-dodecenoic acid are treated at room temperature with 33.3 g of thionyl chloride. The mixture is heated to 60°C. for 20 minutes, the excess thionyl chloride is evaporated off on a rotary evaporator, and 15.8 g of propargyl alcohol are added dropwise. The mixture is again heated to 60°C. for 20 minutes, allowed to cool, poured onto ice-water and exhaustively extracted with diethyl ether. The combined ether solutions are washed with saturated, aqueous sodium bicarbonate solution and saturated, aqueous sodium chloride solution, dried over sodium sulphate and evaporated. The practically pure cis/trans-7,11-dichloro-3,7,11-trimethyl-2-dodecenoic propynyl ester is purified by chromatography on silica gel with hexane/diethyl ether (4:1 parts by volume). A sample boils in a bulb-tube at ca 135°C/0.002 mmHg; $n_D^{20}$ = 1.4926.

EXAMPLE 42

7.2 g. of sodium hydride (55% Nujol suspension) are washed twice with hexane, covered with 75 ml. of absolute tetrahydrofuran, and, with ice-cooling, 28.7 g. of trans-7-chloro-3,7-dimethyl-2-octen-1-ol in 220 ml. of absolute tetrahydrofuran are added dropwise. The mixture is then stirred for 1.5 hours at room temperature. There are subsequently added dropwise 19.6 g. of propargyl bromide in 55 ml. of absolute tetrahydrofuran and thereafter, with occasional ice-cooling, 66.5 ml. of hexamethyl phosphoric acid triamide. The mixture is stirred at room temperature for 3.5 hours, poured onto water, and exhaustively extracted with diethyl ether. The combined ether solutions are washed with saturated, aqueous sodium chloride solution, dried over sodium sulfate and evaporated. By chromatography on silica gel with hexane/diethyl ether (3:2 parts by volume) there is obtained pure trans-7-chloro-3,7-dimethyl-2-octenyl propynyl ether; $n_D^{20}$ = 1.4783.

EXAMPLE 43

3.42 g. of sodium hydride (55 percent Nujol suspension) are washed twice with hexane, covered with 35 ml. of absolute tetrahydrofuran, and, with ice-cooling, 14.9 g. of trans-7-chloro-3,7 dimethyl-2-octen-1-ol in 115 ml. of absolute tetrahydrofuran are added dropwise. The mixture is stirred at room temperature for 1.5 hours. There are subsequently added dropwise 9.5 g. of allyl bromide in 26 ml. of absolute tetrahydrofuran and thereafter, with occasional ice-cooling, 31.5 ml. of hexamethyl phosphoric acid triamide. The mixture is stirred at room temperature for 3.5 hours, poured onto water and exhaustively extracted with diethyl ether. The combined ether solutions are washed with saturated aqueous sodium chloride solution, dried over sodium sulfate and evaporated. By chromatography on silica gel with hexane/diethyl ether (3:2 parts by volume) there is obtained pure trans-7-chloro-3,7-dimethyl-2-octenyl propenyl ether; $n_D^{20}$ = 1.4756

EXAMPLE 44

A solution of 30.7 g. of trans-7-chloro-3,7-dimethyl-2-octenoic acid in 200 ml. of absolute diethyl ether is added dropwise over a period of one hour at −5°C. to a solution of 6.26 g. of lithium aluminum hydride in 50 ml. of absolute diethyl ether, and the mixture is stirred for 2 hours at room temperature. The mixture is subsequently hydrolyzed by the dropwise addition of 2-N-hydrochloric acid with ice-cooling and exhaustively extracted with diethyl ether. The combined ether phases are washed to neutrality, dried over sodium sulfate and evaporated. By chromatography on silica gel with hexane/diethyl ether (3:2 parts by volume) there is obtained pure trans-7-chloro-3,7-dimethyl-2-octen-1-ol; $n_D^{20}$ = 1.4760.

EXAMPLE 45

*Dysdercus cingulatus:* Sterilant action.

Filter paper strips of 90 cm² area are uniformly drenched with a solution of a chloro compound of this application in acetone and allowed to dry. For each test, a plastic beaker is lined with the filter paper, and there are placed therein 3–4 pairs each of freshly moulted imagos which are fed with cotton seeds and water. The laying of eggs commences after a few days. The eggs are removed daily and brought into vessels suitable for the hatching of the larvae.

The activity of the chloro compound manifests itself in the drying-off of the embryos in the egg or the larvae shortly after hatching (the viability of the larvae is only tested up to the second larval stage).

The results of the tests for each chloro compound are set forth in Table I. Activity is expressed in percent egg mortality compared with the control. Dosage is stated in $10^{-x}$ g. of chloro compound/cm² of filter paper. Dosage 5 accordingly signifies: $10^{-5}$ g./cm².

Table I

| Chloro compound | Concentration $10^{-x}$ g. chloro compound/cm² (Dosage) | Sterilant action in percent |
| --- | --- | --- |
| trans-7,11-dichloro-3,7,11-trimethyl-2-dodecenoic acid propynyl ester | 5 | 100 |
|  | 6 | 100 |
| trans-7,11-dichloro-3,7,11-trimethyl-2-tridecenoic acid propynyl ester | 5 | 100 |
|  | 6 | 100 |
| trans-7,11-dichloro 3,7,11-trimethyl-2-dodecenyl propynyl ether | 4 | 100 |
|  | 5 | 100 |

EXAMPLE 46

*Ephestia kuhniella:* ovicidal action

Roundels (10 cm²) of cotton material are drenched with a solution of a chloro compound of this application in acetone and carefully dried. For each test, 30–60 freshly laid eggs of the flour moth are laid on the roundels and brought to hatching in a small plastic cage at 25°C. and high atmospheric humidity.

The activity of the chloro compound manifests itself in an earlier or later dying-off of the embryos in the egg or on hatching.

The results of the test for each chloro compound are set forth in Table 2. Activity is expressed in percent egg mortality. The dosage is stated in $10^{-x}$ g. of chloro compound/cm² of cotton material. Dosage 3 accordingly signifies $10^{-3}$ g./cm².

Table 2

| Chloro compound | Concentration $10^{-x}$ g. chloro compound/cm² (Dosage) | Egg mortality in percent |
| --- | --- | --- |
| trans-7-chloro-3,7-dimethyl-2-octenoic acid propynyl ester | 6 | 100 |
|  | 7 | 100 |
| trans-7-chloro-3,7-dimethyl-2-nonenoic acid propynyl ester | 6 | 100 |
|  | 7 | 100 |
| cis/trans-7-chloro-3-ethyl-7-methyl-2-nonenoic acid propynyl ester | 6 | 100 |
|  | 7 | 50 |
| cis-7-chloro-3,7-dimethyl-2-nonenoic acid propynyl ester | 6 | 100 |
|  | 7 | 100 |
| cis/trans-7,11-dichloro 3,7,11-trimethyl-2-dodecenoic acid propynyl ester | 5 | 100 |
|  | 6 | 100 |
| trans-7,11-dichloro-3,7,11-trimethyl-2-dodecenoic acid propynyl ester | 5 | 100 |
|  | 6 | 100 |
| trans-7,11-dichloro-3,7,11-trimethyl-2-tridecenoic acid propynyl ester | 5 | 100 |
|  | 6 | 50 |
| trans-7,11-dichloro-3,7,11-trimethyl-2-dodecenoic acid propenyl ester | 5 | 100 |
|  | 6 | 50 |

What is claimed is:

1. 7-chloro-3,7-dimethyl-2-octenoic acid propynyl ester.
2. 7-chloro-3,7-dimethyl-2-nonenoic acid allyl ester.
3. 7-chloro-3,7-dimethyl-2-nonenoic acid propynyl ester.
4. As a composition of matter, a mixture of 6- and 7-chloro-3,6,7-trimethyl-2-octenoic acid propynyl ester.
5. 7-chloro-3-ethyl-7-methyl-2-nonenoic acid propynyl ester.

* * * * *